(12) United States Patent
    Forssell et al.

(10) Patent No.: US 9,992,704 B2
(45) Date of Patent: Jun. 5, 2018

(54) RADIO ACCESS NETWORK BASED TRAFFIC STEERING TO NON-CELLULAR ACCESS

(71) Applicant: Provenance Asset Group LLC, Essex, CT (US)

(72) Inventors: Mika Forssell, Söderkulla (FI); Jari Pekka Mustajarvi, Espoo (FI); Janne Petteri Tervonen, Espoo (FI)

(73) Assignee: Provenance Asset Group LLC, Essex, CT (US)

( * ) Notice: Subject to any disclaimer, the term of this patent is extended or adjusted under 35 U.S.C. 154(b) by 603 days.

(21) Appl. No.: 13/862,091

(22) Filed: Apr. 12, 2013

(65) Prior Publication Data

US 2014/0307550 A1 Oct. 16, 2014

(51) Int. Cl.
    *H04W 28/08* (2009.01)
    *H04W 36/14* (2009.01)
    *H04W 36/22* (2009.01)
    *H04W 84/12* (2009.01)

(52) U.S. Cl.
    CPC ........... *H04W 28/08* (2013.01); *H04W 36/14* (2013.01); *H04W 36/22* (2013.01); *H04W 84/12* (2013.01)

(58) Field of Classification Search
    None
    See application file for complete search history.

(56) References Cited

U.S. PATENT DOCUMENTS

| 8,627,493 | B1* | 1/2014 | Chickering | G06F 21/00 705/64 |
| 2004/0205158 | A1* | 10/2004 | Hsu | 709/218 |
| 2011/0149928 | A1* | 6/2011 | Wu et al. | 370/338 |
| 2011/0320588 | A1* | 12/2011 | Raleigh | H04W 36/245 709/224 |
| 2013/0065585 | A1* | 3/2013 | Pelletier | H04W 4/02 455/435.1 |
| 2013/0176897 | A1* | 7/2013 | Wang et al. | 370/254 |
| 2013/0183935 | A1* | 7/2013 | Holostov | H04W 12/06 455/411 |
| 2013/0322238 | A1* | 12/2013 | Sirotkin | H04W 28/0247 370/230 |
| 2014/0043966 | A1* | 2/2014 | Lee et al. | 370/230 |
| 2014/0071942 | A1* | 3/2014 | Ye | 370/331 |

(Continued)

FOREIGN PATENT DOCUMENTS

WO 2004/077753 A2 9/2004

OTHER PUBLICATIONS

S2-130920; Broadcom Corporation, AT&T; "Discussion: Interaction between ANQP / GAS parameters and WLAN_NS"; 3GPP SA WG2 Meeting #96; San Diego, California, USA, Apr. 8-12, 2013.

(Continued)

*Primary Examiner* — Duc T Duong
(74) *Attorney, Agent, or Firm* — Dinsmore & Shohl LLP (57) ABSTRACT

Various communication systems may benefit from traffic steering. For example, radio access network based traffic steering can be used to benefit of communications by steering traffic to Wi-Fi leveraging Hotspot 2.0. A method can include determining that an off-load condition exists in an area of a radio access network. The method can also include commanding a user equipment to off-load to non-cellular radio access based on the determining.

8 Claims, 9 Drawing Sheets

(56) References Cited

U.S. PATENT DOCUMENTS

| | | | |
|---|---|---|---|
| 2014/0082697 A1* | 3/2014 | Watfa | H04W 76/025 726/3 |
| 2014/0105007 A1* | 4/2014 | Pathmasuntharam et al. | 370/230 |
| 2014/0161103 A1* | 6/2014 | Sirotkin et al. | 370/332 |
| 2014/0161256 A1* | 6/2014 | Bari | H04W 12/06 380/247 |
| 2014/0192643 A1* | 7/2014 | Kalapatapu | H04W 48/00 370/230 |
| 2014/0204745 A1* | 7/2014 | Nuss | H04W 28/08 370/232 |
| 2014/0204834 A1* | 7/2014 | Singh et al. | 370/315 |
| 2014/0204904 A1* | 7/2014 | Xiang et al. | 370/331 |
| 2014/0204909 A1* | 7/2014 | Cheng | H04W 8/082 370/331 |
| 2014/0286159 A1* | 9/2014 | Etemad et al. | 370/230 |
| 2014/0321267 A1* | 10/2014 | Jiang et al. | 370/225 |
| 2014/0334446 A1* | 11/2014 | Lim et al. | 370/331 |
| 2014/0341076 A1* | 11/2014 | Orlandi | H04W 48/18 370/254 |
| 2015/0078359 A1* | 3/2015 | Scahill et al. | 370/338 |
| 2015/0189557 A1* | 7/2015 | Touati | H04W 36/0066 370/332 |
| 2015/0365868 A1* | 12/2015 | Chang | H04W 48/18 370/230 |
| 2016/0044567 A1* | 2/2016 | Baghel | H04W 28/08 370/331 |
| 2017/0041827 A1* | 2/2017 | Chou | H04W 52/0258 |
| 2017/0303330 A1* | 10/2017 | Cho | H04W 24/10 |

OTHER PUBLICATIONS

International Search Report application No. PCT/EP2014/055925 dated Sep. 5, 2014.

3GPP TS 23.401 V11.5.0 (Mar. 2013) "3rd Generation Partnership Project; Technical Specification Group Services and System Aspects; General Packet Radio Service (GPRS) enhancements for Evolved Universal Terrestrial Radio Access Network (E-UTRAN) access (Release 11)"; pp. 1-286; 3rd Generation Partnership Project (3GPP); Mobile Competence Centre; 650, Route des Lucioles; F-06921 Sophia-Antipolis Cedex; France.

3GPP TS 23.402 V11.6.0 (Mar. 2013) "3rd Generation Partnership Project; Technical Specification Group Services and System Aspects; Architecture enhancements for non-3GPP access (Release 11)"; pp. 1-252; 3rd Generation Partnership Project (3GPP); Mobile Competence Centre; 650, Route des Lucioles; F-06921 Sophia-Antipolis Cedex; France.

IEEE Std 802.11-2012 (Revision of IEEE Std 802.11-2007) "IEEE Standard for Information technology—Telecommunications and information exchange between systems Local and metropolitan area networks—Specific requirements; Part 11: Wireless LAN Medium Access Control (MAC) and Physical Layer (PHY) Specifications"; pp. 1-2793; Mar. 29, 2012; IEEE Computer Society; Sponsored by the LAN/MAN Standards Committee; IEEE; 3 Park Avenue; New York; NY 10016-5997; USA.

IEEE Std 802.21-2008 "IEEE Standard for Local and metropolitan area networks—Part 21: Media Independent Handover Services"; pp. 1-323; Jan. 21, 2009; IEEE Computer Society; Sponsored by the LAN/MAN Standards Committee; IEEE; 3 Park Avenue; New York; NY 10016-5997; USA.

* cited by examiner

```
non3GPPInfoIE ::=            SEQUENCE (SIZE (1..maxn3GPP)) OF non3GPPContainer non3GPPContainer ::=         SEQUENCE {
//Hotspot2_0 field enables/disables ANQP based Wi-Fi selection, when disabled 3GPP shall be used
    Hotspot2_0               BOOLEAN (enabled, disabled), //3GPP_performance is optional (C=disabled) defining as a reference number
performance/load/QoS/etc. of 3GPP network that the UE may use as a reference when investigating
Wi-Fi network performance to avoid selecting e.g. Wi-Fi with lower bitrate than 3G/LTE currently
serving the UE
    3GPP_performance         INTEGER (0..100), //WiFi_performance is optional (C=disabled) defining the minimum performance/load/QoS/etc. a Wi-
Fi network shall/should fulfill for a UE selecting the network
    WiFi_performance //Optional Hotspot2_0_roaming_consortium may define additional guidance and organization
identifiers that need to be supported by the hotspot selected by the UE
    Hotspot2_0_roaming_consortium  INTEGER (0..) OPTIONAL, //Optional Hotspot2_0_roaming_consortium_list may define additional guidance and organization
identifiers that need to be supported by the hotspot selected by the UE
    Hotspot2_0_roaming_consortium_list  LIST of (INTEGER or STRING) OPTIONAL, Etc.
},
...
}
```

RADIO ACCESS NETWORK BASED TRAFFIC STEERING TO NON-CELLULAR ACCESS

BACKGROUND

Field

Various communication systems may benefit from traffic steering. For example, radio access network based traffic steering can be used to benefit communications by steering traffic to Wi-Fi leveraging Hotspot 2.0.

Description of the Related Art

Non-cellular radio access technologies, such as Wi-Fi networks, are becoming an integral part of mobile broadband. Wi-Fi is already standard feature on smart phones, tablets and laptops and is used by many network operators. However, despite the popularity of Wi-Fi, operators lack a measure of control and lack dynamic mechanisms for determining user device movement between mobile and Wi-Fi networks.

Conventional network selection tools guiding how the user device moves between mobile and Wi-Fi networks are static in nature. For example, third generation partnership project (3GPP) release 8 (rel-8) technical specification (TS) 23.402 Access Network Discovery and Selection Function (ANDSF), which is hereby incorporated herein by reference in its entirety, does not support online communication between user device and ANDSF server to dynamically set network selection policies to user device based on changing network environment.

3GPP TS 23.402 allows defining static Wi-Fi selection rules into user devices but as such does not support online on need-based communication. ANDSF allows defining detailed criteria for network selection, like time of day, location and application.

A 3GPP standard, for example 3GPP rel-8 TS 23.401, which is hereby incorporated herein by reference in its entirety, defines Radio Access Technology (RAT) Frequency Selection Priority (RFSP) allowing a mobile operator to control subscriber 2G/3G/LTE access network selection in idle mode and operator resource assignments from these networks for the user in active mode. For one user 1: 3G 2100 MHz 2: 4G 2600 MHz 3: 2G 900 MHz may be applied and to another user 1: LTE 2600 MHz 2: LTE 800 MHz 3: 3G 2100 MHz 4: 2G 900 MHz may be applied.

SUMMARY

According to a first embodiment, a method may include determining that an off-load condition exists in an area of a cellular radio access network. The method may also include commanding a user equipment to off-load to non-cellular radio access based on the determining.

According to a second embodiment, a method may include receiving a message commanding off-load to non-cellular access. The method may also include searching for non-cellular access points based on the received message. The method may further include identifying at least one non-cellular access point based on the searching According to a third embodiment, a method may include determining whether a user equipment is to be permitted a non-cellular access. The method may also include instructing a non-cellular access network based on the determination.

According to a fourth embodiment, a method may include receiving instruction regarding whether a user equipment is to be permitted non-cellular access. The method may also include receiving a request from a user equipment regarding a property of a non-cellular access. The method may further include responding to the request based on the instruction regarding whether the user equipment is to be permitted non-cellular access.

According to a fifth embodiment, an apparatus can include at least one processor and at least one memory including computer program code. The at least one memory and the computer program code are configured to, with the at least one processor, cause the apparatus at least to determine that an off-load condition exists in an area of a cellular radio access network. The at least one memory and the computer program code are also configured to, with the at least one processor, cause the apparatus at least to command a user equipment to off-load to non-cellular radio access based on the determining According to a sixth embodiment, an apparatus includes at least one processor and at least one memory including computer program code. The at least one memory and the computer program code are configured to, with the at least one processor, cause the apparatus at least to receive a message commanding off-load to non-cellular access. The at least one memory and the computer program code are also configured to, with the at least one processor, cause the apparatus at least to search for non-cellular access points based on the received message. The at least one memory and the computer program code are further configured to, with the at least one processor, cause the apparatus at least to identify at least one non-cellular access point based on the searching According to a seventh embodiment, an apparatus includes at least one processor and at least one memory including computer program code. The at least one memory and the computer program code are configured to, with the at least one processor, cause the apparatus at least to determine whether a user equipment is to be permitted a non-cellular access. The at least one memory and the computer program code are also configured to, with the at least one processor, cause the apparatus at least to instruct a non-cellular access network based on the determination.

According to an eighth embodiment, an apparatus includes at least one processor and at least one memory including computer program code. The at least one memory and the computer program code are configured to, with the at least one processor, cause the apparatus at least to receive instruction regarding whether a user equipment is to be permitted non-cellular access. The at least one memory and the computer program code are also configured to, with the at least one processor, cause the apparatus at least to receive a request from a user equipment regarding a property of a non-cellular access. The at least one memory and the computer program code are further configured to, with the at least one processor, cause the apparatus at least to respond to the request based on the instruction regarding whether the user equipment is to be permitted non-cellular access.

According to a ninth embodiment, an apparatus may include determining means for determining that an off-load condition exists in an area of a cellular radio access network. The apparatus may also include commanding means for commanding a user equipment to off-load to non-cellular radio access based on the determining According to a tenth embodiment, an apparatus may include receiving means for receiving a message commanding off-load to non-cellular access. The apparatus may also include searching means for searching for non-cellular access points based on the received message. The apparatus may further include identifying means for identifying at least one non-cellular access point based on the searching According to an eleventh embodiment, an apparatus may include determining means for determining whether a user equipment is to be permitted a non-cellular access. The apparatus may also include instructing means for instructing a non-cellular access network based on the determination.

According to a twelfth embodiment, an apparatus may include receiving means for receiving instruction regarding whether a user equipment is to be permitted non-cellular access and for receiving a request from a user equipment regarding a property of a non-cellular access. The apparatus may further include responding means for responding to the request based on the instruction regarding whether the user equipment is to be permitted non-cellular access.

According to thirteenth through sixteenth embodiments, respectively, a non-transitory computer-readable medium can be encoded with instructions that, when executed in hardware, perform a process. The process can correspond to the method of the first through fourth embodiments, respectively.

BRIEF DESCRIPTION OF THE DRAWINGS

For proper understanding of the invention, reference should be made to the accompanying drawings, wherein.

DETAILED DESCRIPTION

Certain embodiments may provide operators with tools to perform various functions. For example, certain embodiments may help operators balance traffic between mobile and Wi-Fi networks to improve user experience and avoid congestion on one of the networks. Moreover, certain embodiments may help to perform 3G/LTE cell congestion based offload to Wi-Fi to improve user experience and use Wi-Fi as a backup capacity when needed. Furthermore, for example, certain embodiments may permit offloading UE to roaming partner Wi-Fi costing extra for the operator only when own network, mobile and optionally own Wi-Fi hotspots, does not have enough available capacity, like during a mass event. Likewise, certain embodiments may permit operators to keep a user in 3G/LTE for ensured service quality or similar purposes and to offload to Wi-Fi only when cell becomes congested Conventionally, user equipment and devices including smartphones prioritize Wi-Fi over mobile networks. Thus, for example, when a user uses an application, like browser or a streaming video service, the device goes automatically to pre-configured/earlier used Wi-Fi, when available, taking data away from mobile network. According to certain embodiments, mobile operator tools can be used to balance traffic between mobile and Wi-Fi.

Hotspot 2.0 is a standard for local area non-cellular wireless communication that may be supported by new Wi-Fi devices and networks. Moreover, Hotspot 2.0 includes Access Network Query Protocol (ANQP) which the UE is able to use to acquire additional Wi-Fi access point (AP) information before connecting to the hotspot. For example the UE can learn the load of the Wi-Fi AP to avoid connecting to a congested AP, services provided through the hotspot, like whether there is an association to home operator, AP capabilities, list of operator friendly names, public land mobile network (PLMN) identifier reachable through the Wi-Fi network, performance data (like AP load, WAN (Wide Area Network) metrics including e.g. uplink/downlink speed and load), etc. Herein, access points running Hotspot 2.0 as well as other WiFi access points are examples of "non-cellular" access.

Figure 1:
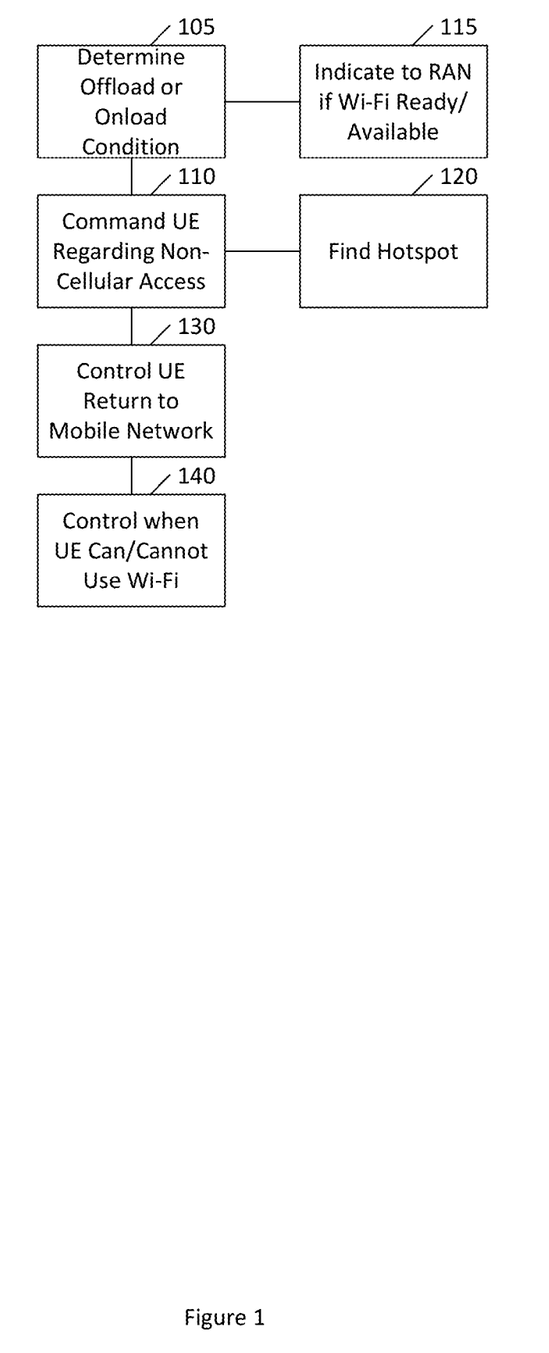
FIG. 1 illustrates a method according to certain embodiments.

FIG. 1 illustrates a method according to certain embodiments. As shown in FIG. 1, at 110, a radio access network (RAN) can command a user equipment (UE) or other user device to look for (or not to look for) suitable non-cellular access, such as Wi-Fi APs. This may be triggered by a prior determination in the RAN at 105 that there is cell congestion or a lack of cell congestion. RAN can utilize system information block (SIB) message(s), radio resource control (RRC) message(s), cell broadcast, paging or any other suitable communication means to communicate this command to the user equipment (UE). In case the method is based on UE-specific signaling, the UE can, at 115, indicate to the RAN whether it supports Wi-Fi and is enabled, and information if he UE has already checked the availability of Wi-Fi. Optionally, the UE can indicates to RAN only the Wi-Fi networks the UE can access, for example the Wi-Fi networks for which the UE has authentication credentials. This may allow RAN to know if UE has Wi-Fi available and the UE can access the Wi-Fi. The UE may also indicate current load information and available signal quality characteristics of the networks that the UE can access and/or for which the UE has authentication credentials.

The RAN can, more precisely, control when and where UE uses 3GPP and Wi-Fi networks. For example, when the UE has been commanded to look for Wi-Fi network, at 110, the UE and Wi-Fi AP Hotspot 2.0 capabilities enable the UE to find a suitable hotspot, at 120. The RAN can also, at 130, control when the UE needs to return back to the mobile network. Alternatively, this information can also be conveyed via the Wi-Fi network. Optionally, the RAN can control, at 140, when the UE cannot access Wi-Fi hotspot. As a result, a simple solution for dynamic RAN-controlled Wi-Fi selection can be created supported by UEs and networks.

Figure 2:
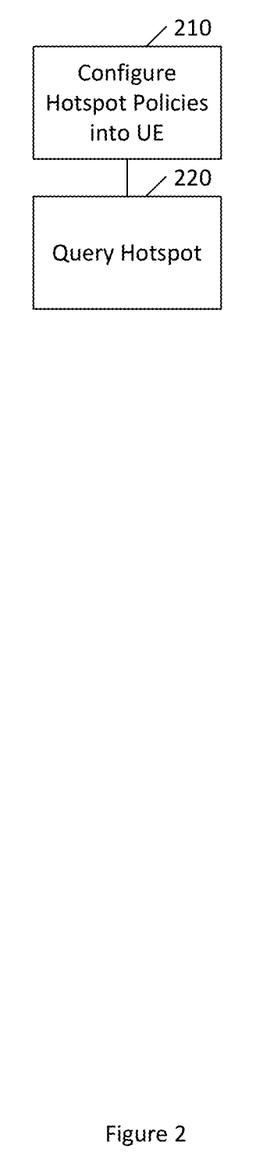
FIG. 2 illustrates another method according to certain embodiments.

FIG. 2 illustrates a method of user equipment configuration and querying. As shown in FIG. 2, at 210, a device management (DM) server can configure Hotspot 2.0 policies into UEs, for example operator subscriber devices having Wi-Fi service. Based on over the air configured policies, at 220, the UE can identify online by making an ANQP query to a hotspot if the hotspot supports UE services and has, for example, a relationship with a UE home operator.

Over the air configuration of Hotspot 2.0 policies is one approach. Without over the air configuring Hotspot 2.0 policies to the UE, the user may need to manually configure network selection preferences into the UE or an operator needs to pre-install Hotspot 2.0 network selection preferences to the UE for example before selling the UE to the subscriber.

However, Hotspot 2.0 may support automatic Wi-Fi network selection for limited use scenarios. For example, if a UE can see any AP advertising connection to UE's home mobile/Wi-Fi operator, UE can automatically connect to that without any Hotspot 2.0 policy information. But Hotspot 2.0 may not provide any way to differentiate between different Wi-Fi networks. If a UE can see two different service set identifiers (SSIDs)/Wi-Fi networks both advertising connection to UE's home (Wi-Fi) operator, it may be up to the UE's implementation/user to select the Wi-Fi AP/network. An exception to this approach is a Wi-Fi network where both Wi-Fi radio access network and service provider are operated by the same operator that is also UE's home (Wi-Fi) operator: If a UE can see an AP/Wi-Fi network that advertises being operated by UE's home (Wi-Fi) operator and one of the service providers is also UE's home (Wi-Fi) operator, UE can select that Wi-Fi network before any other Wi-Fi network.

Figure 3:
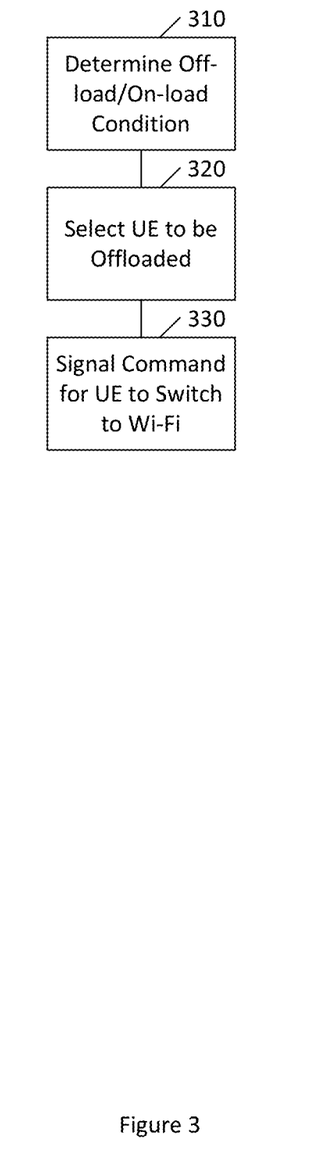
FIG. 3 illustrates a further method according to certain embodiments.

FIG. 3 illustrates a method according to certain embodiments. RAN can be eNode B (eNB), radio network controller (RNC) or base station controller (BSC) in current networks containing Radio Resource Management (RRM) and Radio Access Technology (RAT) coordination. RAN can be also a centralized RRM element or centralized RRM functionality in an existing element, like RNC. The RAN can control UE mobile network (for example, 2G, 3G, LTE, or LTE-A) and Wi-Fi network usage. For example, by default operator business strategy is used where, for example, a voice-centric user is kept in 2G network by default and data-centric subscribers in 3G/LTE networks by default, and Wi-Fi network can be used only as capacity backup network for data users. For example, UEs may use mobile network by default and Wi-Fi only when commanded by RAN.

RAN RRM, scheduler, admission control etc. can, at 310, determine network congestion, inability to maintain quality of service (QoS) or quality of experience (QoE) for a user, a user experience problem, a situation in which the UE has poor radio quality due to being located at cell edge or far from a base station, or the like condition. When such a determination is affirmative, the RAN can, at 320, select UEs to be offloaded to a nearby Wi-Fi network. The selected UE can be for example platinum, gold, silver or bronze UE, UE on cell edge having challenging radio conditions, UE having selected ongoing service (like P2P or streaming video services), UE having defined QoS profile/characteristics, UE having poor radio condition, or the like.

After selecting one or more UE(s), the RAN, at 330, can signal a command for the UE(s) to switch to Wi-Fi network. The command can be signaled in a variety of ways. For example, the command can be signaled in RRC or in another bearer/mobility management message as a new field or as an extension to an existing field. For example, the extension may be an extension to current handover command where Wi-Fi network is indicated.

In order to prevent RAN from continuously commanding the UE to go to Wi-Fi when it is not possible for the UE, the UE can indicate to the network whether it supports Wi-Fi and whether Wi-Fi is enabled (optionally if the UE has authentication credentials to available Wi-Fi networks), if, for example, the UE has already checked Wi-Fi availability with the result "no Wi-Fi available." This information can be realized with a new field or as an extension to an existing field. Only when the UE indicates Wi-Fi is enabled and no indication about "no Wi-Fi available," the RAN can send the command to the UE to try to go to Wi-Fi. Alternatively RAN could also allocate requested resource from 3GPP network but at the same time could indicate to the UE that WLAN is a preferred method. UE could then search for WLAN and if found then could request further resources from the WLAN.

The command can alternatively be signaled in SIB or RRCConnectionRelease message by defining Wi-Fi or Hotspot 2.0 ANQP as a new RAT priority in addition to GSM 1800, 3G 2100 etc. RATs. See in below an example about RFSP mechanism details.

In another alternative, the command can be signaled in an SIB message in case the command is generic for all UEs camped into the cell. Alternatively, the command can be signaled in another suitable 3GPP message transferred between UE and RAN over the radio.

If a RAN decides to move a UE to a specific Wi-Fi network, which may be identified for example with SSID and MAC, the RAN may send user or UE profile/characteristics to the target Wi-Fi network or Wi-Fi AP in a separate message. The profile/characteristics may include one or more of the following: Full or subset of 3GPP QoS profile, Wi-Fi Multimedia (WMM) QoS profile (for example, RAN can convert 3GPP QoS into WMM QoS), user/UE identities (such as IMSI and/or MAC), services the UE had active under RAN, and the like. This may enable the Wi-Fi network to appropriately handle the UE from the point the UE accesses the Wi-Fi. For example, the Wi-Fi AP may be able to prioritize UE and/or traffic, reserve enough resources for the UE in admission/resource control, and so on. The message the RAN sends to Wi-Fi can be the same or different from a message the RAN may use to control whether the UE is allowed to access the Wi-Fi or not.

Other characteristics or properties can also be communicated. For example, in addition to the characteristics listed above, the RAN can provide the Wi-Fi network/controller with traffic filters enabling the Wi-Fi network (for example, Wi-Fi GW) later to route selected flows to packet core and PGW and route other traffic of a single user directly to the Internet. The traffic filters can be based on for example 3GPP Traffic Flow Templates used with PDP Contexts/Sessions or ANDSF ISRP (Inter-System Routing Policies). In case ANDSF ISRP are used, ANDSF server may deliver UE specific ISRP policies (defining application/service specific network selection policies) also to RAN and/or Wi-Fi GW in addition to delivering the policies to the UE.

It is not necessary for the RAN to know/identify MAC of the target network. In an alternative, however, RAN may identify Homogenous Extended Service Set ID (HESSID), or other network identification information available e.g. through Hotspot 2.0, though.

When the RAN communicates with the Wi-Fi network, this can be communication with a Wi-Fi controller or similar. It is not necessary for the RAN to communicate directly to any WLAN AP, although direct communication could be used if the APs are autonomous.

Thus, in certain embodiments the RAN may first determine under which Wi-Fi controller the device exists. A device may, therefore, in certain cases monitor and report specific Wi-Fi AP by MAC address or Wi-Fi network by HESSID. Thus, in certain cases the Wi-Fi AP may be identified in a non-unique way to the RAN, such as by the network to which the Wi-Fi AP is associated.

The RAN could deliver WMM QoS profile to a Wi-Fi controller. This may allow WLAN to prioritize downlink traffic for such a user. Typically in WMM enabled networks each WMM class creates own queue, both in uplink and in downlink. In uplink the random access parameters for high priority WMM class allow more opportunities to send than for lower priority VMM class. In downlink the AP can freely decide whose packet will be scheduled first. Conventionally, the highest priority WMM queue is always drained before lower priority queues, although in certain embodiments this could be modified.

If channel reservation (WMM-AC) is deployed, then APs may be able to reserve capacity, for example fixed slots, for devices to use.

RAN can identify the target Wi-Fi AP by, for example, commanding the UE to perform Wi-Fi measurements (on all available Wi-Fi APs or selected Wi-Fi APs communicated to the UE) where the UE includes for example SSID, radio quality and MAC of detected Wi-Fi AP into the measurement report sent to the RAN.

Figure 4:
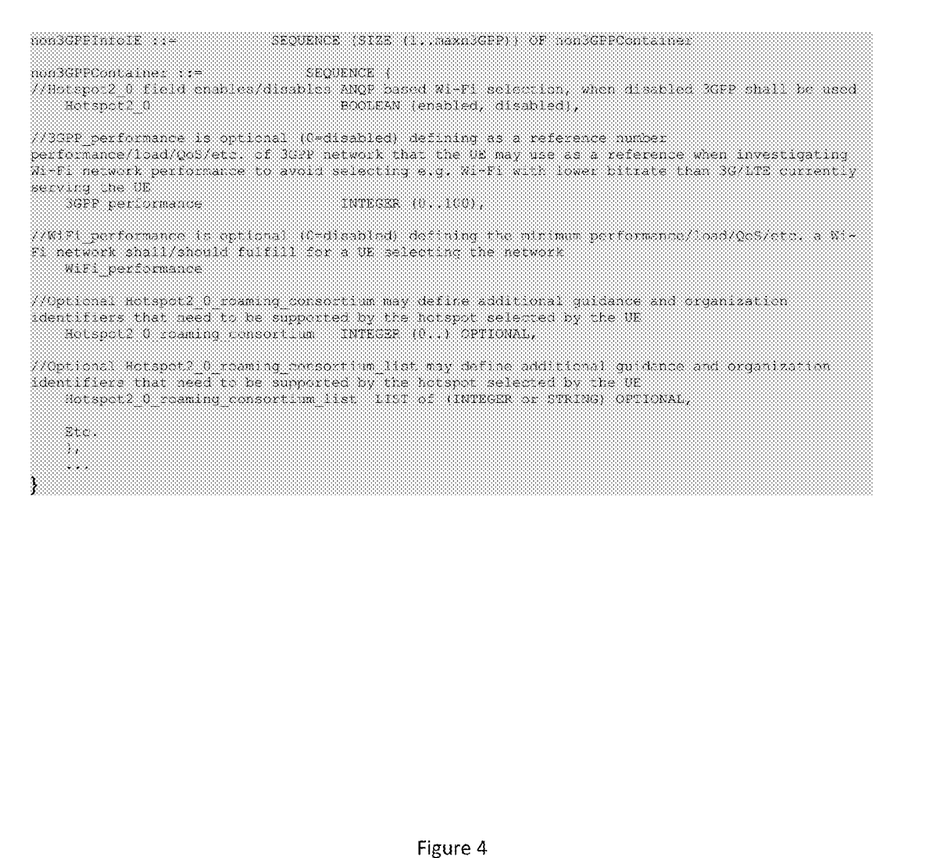
FIG. 4 illustrates an example information element according to certain embodiments.

FIG. 4 illustrates an example information element according to certain embodiments. The example information element shown in FIG. 4 can be introduced into SIB, RRC etc. message transferred between RAN and UE. The fields shown are only exemplary, and not all the fields need to be present. The example information element defines optional info giving additional criteria for the UE to consider when selecting Wi-Fi network to be used, based on information Hotspot 2.0 supports.

One alternative when using RFSP mechanism is to include Hotspot 2.0/ANQP as one RAT priority or define Wi-Fi in general as one RAT priority leading the UE to consider Hotspot 2.0 info. In the discussion below, the RFSP RAT priority table is internal to RAN, where the RAN selects an RFSP index to be used for a certain UE or for all UEs in the cell. The RAN can then communicate the RAT priorities, not RFSP index, to affected UEs. For example, in the discussion below the RFSP index is used for the UE and thus the UE can receive HS2.0 ANQP as the highest RAT priority indicating to the UE to utilize Wi-Fi network before utilizing LTE network. In case RAN used RFSP index 2 for the UE, the UE would consider only 3GPP networks when selecting RAT/network to be used. An exception may be home, enterprise etc., where the Wi-Fi network that user may have configured into the UE and that the user wants to use when available may be permitted. By contrast, certain embodiments relate to controlling Wi-Fi network use of operator own hotspots or hotspot providers having roaming agreement to home operator but not limited to those.

The length of this field can also be something else than two bytes. Each subscriber can be allocated to one or more of these user classes.

Figure 5:
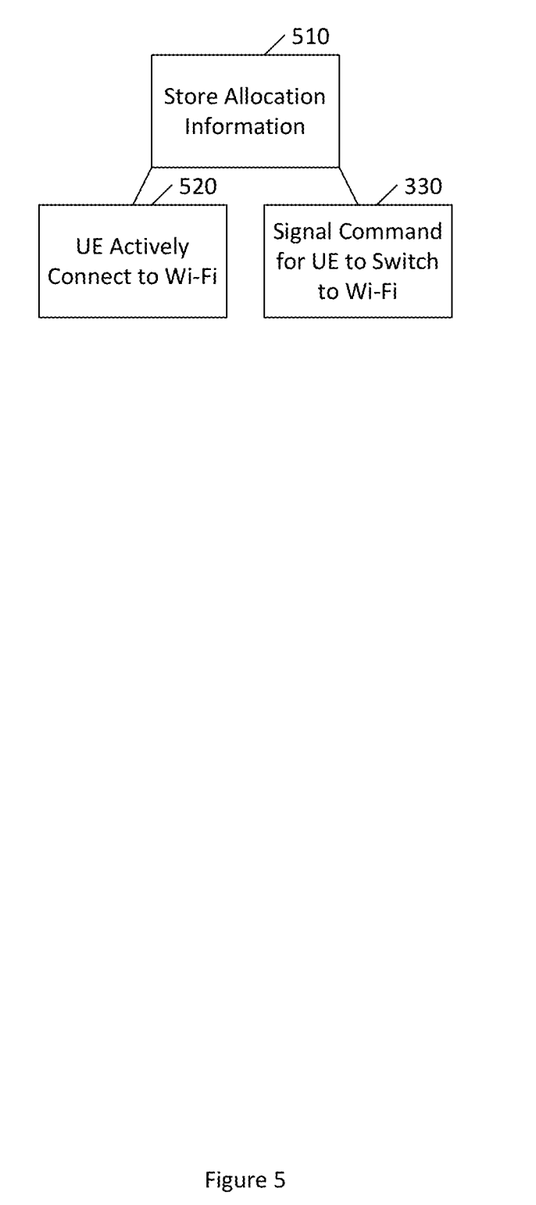
FIG. 5 illustrates another method according to certain embodiments.

As shown in FIG. 5, at 510 this allocation information can be stored as part of the subscription profile in home location register (HLR)/home subscriber server (HSS), policy control server such as a policy charging and rules function (PCRF), or like network component storing user profile details. Whenever a bit corresponding to one user class is set to '1', UEs belonging to that user class can, at 520, actively try to connect to the Wi-Fi, using Hotspot 2.0 (HS2.0) or any other available mechanisms. When the bit is set back to zero, or when UE moves into a new cell with the bit set to zero, at 530 the UEs belonging to that user class can stop using Wi-Fi and can start to prefer a 3GPP RAT.

Figure 6:
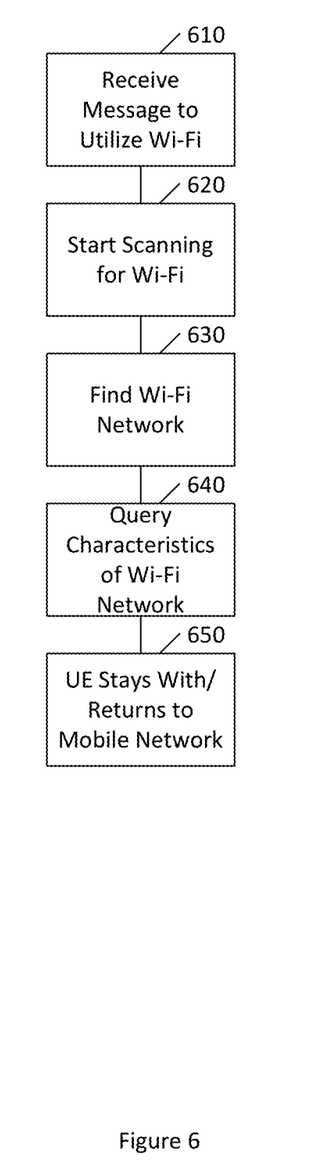
FIG. 6 illustrates a method according to certain embodiments.

FIG. 6 illustrates a method according to certain embodiments. At 610, a UE can receive a message from a RAN to utilize Wi-Fi network. Therefore, at 620, the UE can start scanning or otherwise searching for Wi-Fi radio and see which Wi-Fi networks are available. Once the UE finds a Wi-Fi network at 630, the UE can use Hotspot 2.0 ANQP at 640 to query, from the Wi-Fi network, for the properties, for example the characteristics, of the network. Without ANQP, the UE can attempt to connect to the Wi-Fi network or learn Wi-Fi characteristics through other IEEE defined mechanisms (like 802.21 Media Independent Handover mechanisms). However, in this case the Wi-Fi performance may not be known before connecting to the AP, unless other 802.11 mechanisms make this available to the UE. In case service providers, roaming consortiums, load/performance etc. meet the UE requirements and optionally RAN set requirements, the UE may select the Wi-Fi AP (hotspot). In case the UE is unable to find a suitable hotspot, at 650 the UE stays or comes back into the mobile network. Here, querying for the properties of the non-cellular access network is one example of requesting properties of the non-cellular access network.

Figure 7:
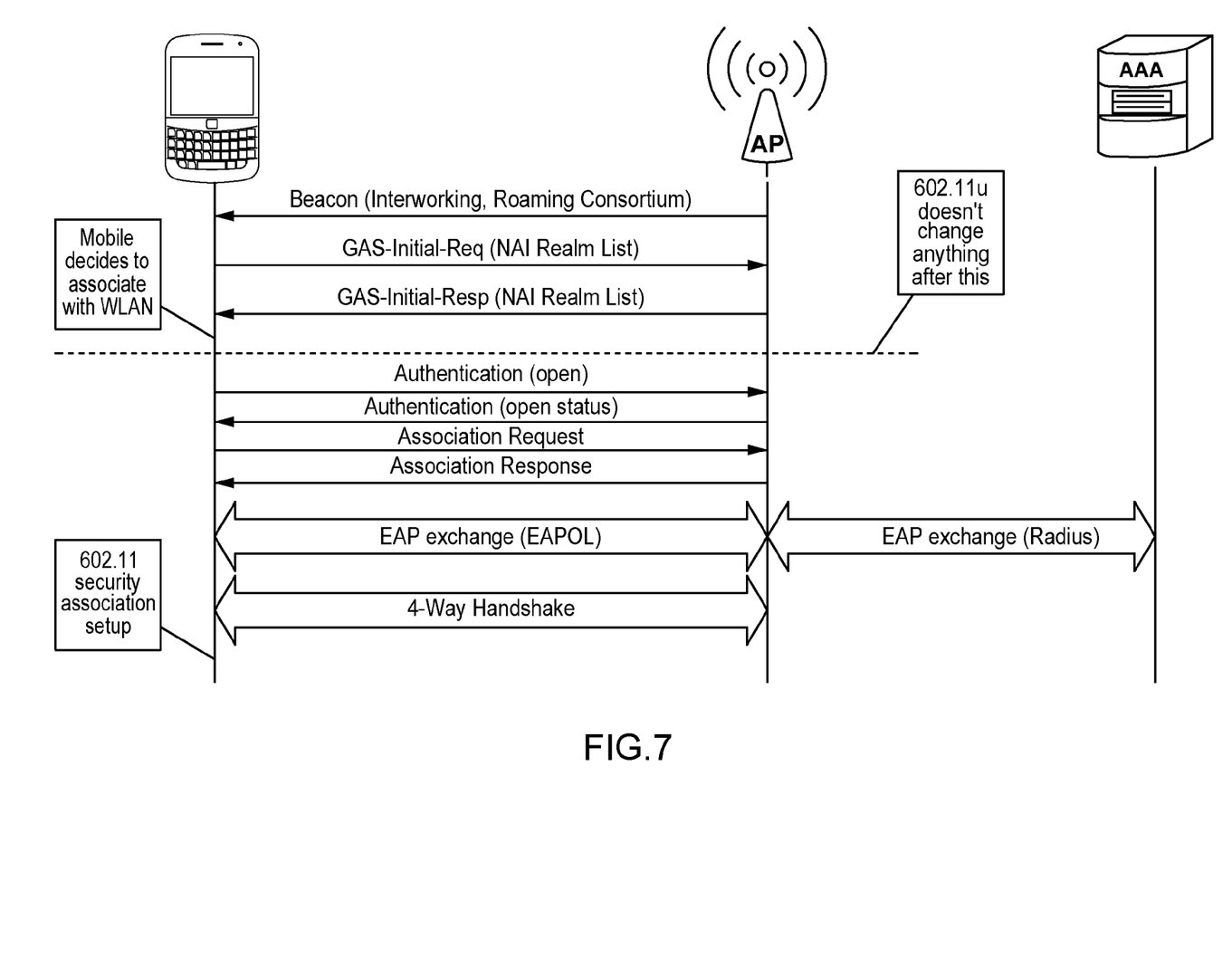
FIG. 7 illustrates messaging according to certain embodiments.

FIG. 7 illustrates messaging according to certain embodiments. More particularly, FIG. 7 illustrates Hotspot 2.0 ANQP messaging (ANQP over GAS) as part of associating and authenticating to a hotspot.

As shown in FIG. 7, the UE can receive a beacon from a Wi-Fi hotspot, and send a generic advertisement service

TABLE 1

| RFSP policy table for a user instructing initially to utilize | | | | | | | |
|---|---|---|---|---|---|---|---|
| RFSP | Priority | | | | | | |
| Index | 7 | 6 | 5 | 4 | 3 | 2 | 1 0 |
| 1 | HS2.0 ANQP | LTE2.6 | UMTS2.1 | UMTS1900 | 2G1800 | 2G900 | |
| 2 | LTE2.6 | UMTS2.1 | UMTS1900 | 2G1800 | 2G900 | | |
| ... 256 | ... | ... | | | | | | only mobile networks.

FIG. 5 illustrates another method according to certain embodiments. As an alternative, without defining a new explicit command to instruct UE to go to a Wi-Fi, a new SIB element can be defined to address certain number of different user groups. For example, a two-byte field can be introduced, where for example 12 first bits represent 12 different user classes and four bits are reserved for other/future use.

(GAS) initial request to the hotspot. In reply, the Wi-Fi hotspot can provide a GAS initial response. This can occur prior to authentication or association.

As mentioned above in reference to FIG. 1, when a RAN has commanded a UE to utilize Wi-Fi network, the RAN may be able to bring the UE back to the mobile network when needed, for example when cell congestion situation is over. The RAN can utilize various mechanisms for doing that.

For example, the RAN can use paging. The UE using the Wi-Fi network can still monitor a paging channel in order not to miss an incoming call or message. Thus, the RAN can send a paging request message with the UE id, for example a temporary ID or international mobile subscriber identity (IMSI) or the like, telling the UE, for example, in a new paging reason code "return back to 3GPP." The UE detecting such a page can return to a 3GPP network and stop using a Wi-Fi network. Optionally the UE can perform access to the 3GPP cell enabling RAN to know the UE has stopped using Wi-Fi.

Alternative, the RAN can use an RFSP mechanism. If an RFSP mechanism is used to steer the UE to Wi-Fi, a T320 timer already defined into RFSP can be used to indicate a validity period for the new RAT priorities. After T320 expires, the UE can revert to earlier used RAT priorities and can come back to a 3GPP network. RAN may set a value for the T320, for example based on pre-configuration, like 15 minutes, or additional intelligence may be used, like history data or user subscription/profile details (for example, a gold user may have a shorter/longer timer than a bronze user), to define the validity period for Wi-Fi selection rule.

In another alternative, the RAN can use a Hotspot 2.0/Wi-Fi mechanism. When the RAN decides a UE should come back from the Wi-Fi network to the 3GPP network, for example when a congestion situation is over, the RAN may send a message to the Wi-Fi network serving the UE to instruct the UE to return to 3GPP network. For example, any of the following three mechanisms may be used.

According to a first option, IEEE 802.11 or Hotspot 2.0 can add a new message or new information element to an existing message that can be sent to a UE utilizing the Wi-Fi network. The UE receiving this information can return back to a 3GPP network and can update RAT priorities. As an example, Hotspot 2.0 can define a triggering mechanism for a UE to contact policy server after successful extensible authentication protocol (EAP) authentication. This trigger can be indicated to the UE using 802.11 Wireless Network Management (WNM) notification mechanism. This mechanism can be extended for 3GPP—Wi-Fi interworking by, for example, defining a new sub-element that indicates to the UE to prefer 3GPP RAT instead of Wi-Fi.

According to a second option, a new EAP-SIM/AKA/AKA' parameter can be added into EAP signaling indicating that the Wi-Fi network does not accept the UE to continue Wi-Fi usage. With the new parameter, it is possible to define UE behavior in 3GPP for Wi-Fi-enabled 3GPP devices.

According to a third option, Wi-Fi network admission control, such as a AAA server, can deny Wi-Fi access for the UE upon RAN or 3GPP network request. For example, a similar procedure can be used as is used when the UE has used Wi-Fi quota or time, for example when a user has bought two hour Wi-Fi access in an airport and it expires. This procedure can deny further Wi-Fi service to the UE, causing the UE to come back to 3GPP network to continue using services. However, without definition of additional functionality, UEs' behavior after receiving this kind of information may be implementation-specific. As an example, a UE may blacklist a Wi-Fi network denying access from the UE and may avoid connecting to the Wi-Fi network indefinitely or for a long time.

In a further alternative, the RAN can use an SIB mechanism. For example, the RAN may indicate in SIB message(s) to the UE that the UE is commanded to return back to 3GPP network. The UE may monitor SIB messages even while using Wi-Fi. There are several options for such a mechanism. For example, according to a first option the RAN can include a list of UE IDs, like temporary ID, into a specific SIB message. According to a second option, the RAN can enable a bit in a selected SIB message telling the UEs in a cell either to revert back to earlier used RAT priorities or instructing the UEs to acquire new RAT selection policies from the RAN, where new RFSP RAT priorities can be sent to the UE using SIB and/or RRC message. According to a third option, a RAN can instruct UEs belonging to a certain user class to come back to cellular network by setting the corresponding bit from one to zero for that user class in the new SIB element, similar to the approach described above.

In order for a RAN/3GPP network/operator to be sure that a user uses 3GPP by default and Wi-Fi only when decided by the 3GPP network, the following options can be used at least for operator own hotspots and optionally for selected roaming partner networks.

Figure 8:
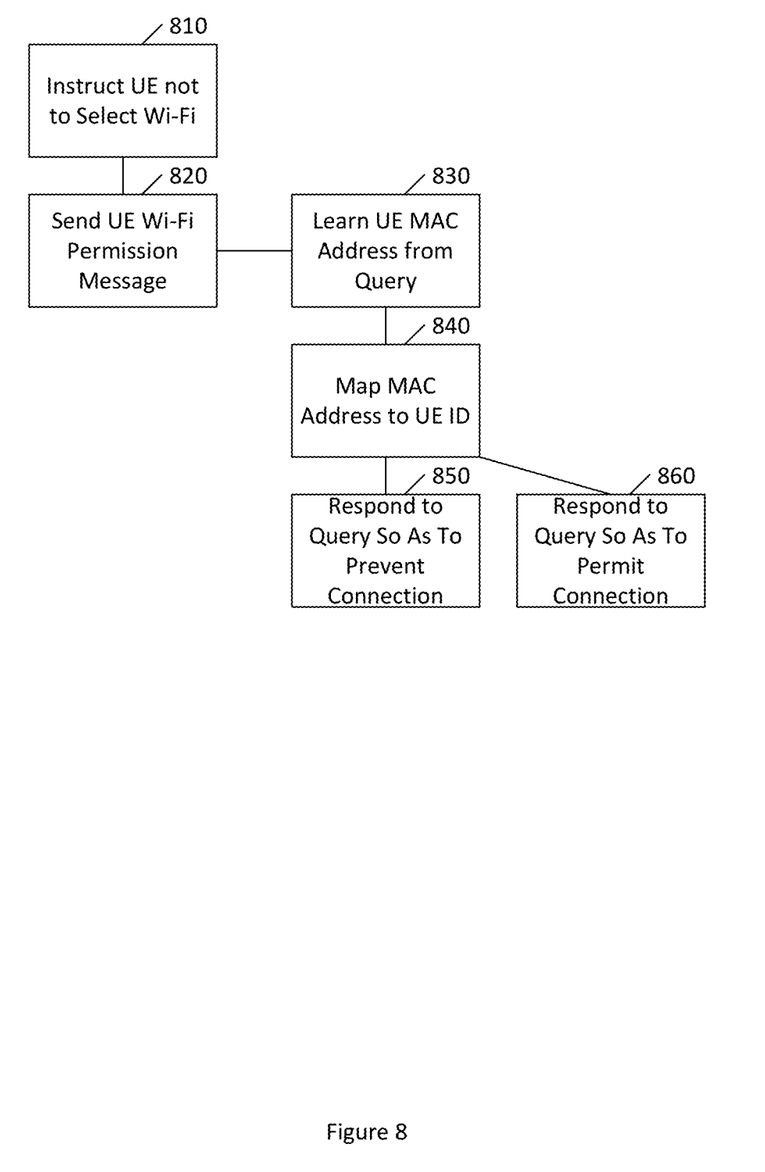
FIG. 8 illustrates an additional method according to certain embodiments.

FIG. 8 illustrates a method according to certain embodiments. As shown in FIG. 8, at 810 the RAN can instruct the Wi-Fi network to provide information to a UE that performs a Hotspot 2.0 ANQP query or uses other 802.11 messaging to learn Wi-Fi AP characteristics. This may lead to the UE not selecting the Wi-Fi AP. For example, at 820 the RAN can send UE_WIFI_PERMISSION (UE ID, disabled) message to ANQP server when UE connects to a new cell. If UE makes ANQP query to Wi-Fi network, the ANQP server can learn, at 830, at least UE medium access control (MAC) address from Wi-Fi AP that can be mapped, at 840, to UE ID using mapping table unless UE ID equals MAC address. When UE with "disabled" status makes an ANQP query, at 850 the ANQP server can indicate "load=FULL" or equal information into ANQP response message to indicate to the UE "don't connect to me." If there is, for example, cell congestion and the UE needs to be offloaded to Wi-Fi, the RAN can send UE_WIFI_PERMISSION (UE ID, enabled) message to ANQP server causing the ANQP server, at 860, to send "normal" ANQP information to the UE, thereby allowing the UE to select the Wi-Fi AP.

Alternatively, Wi-Fi network access/admission control, like a AAA server, can deny Wi-Fi access for the UE upon RAN or 3GPP network request, potentially with a new EAP-SIM/AKA/AKA' parameter as described above for Hotspot 2.0/Wi-Fi mechanisms. For example, upon cell congestion, the RAN can enable Wi-Fi access/service for the UE and thus the UE can access the Wi-Fi network.

Figure 9:
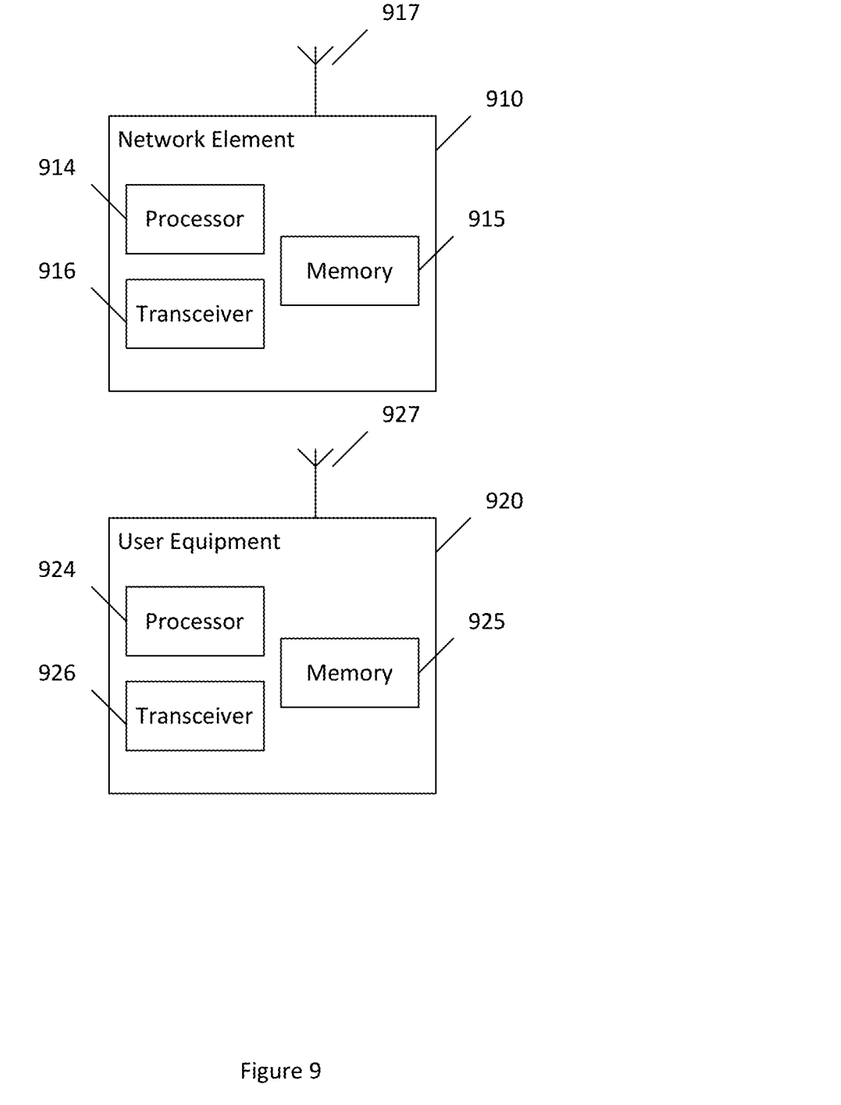
FIG. 9 illustrates a system according to certain embodiments of the invention.

FIG. 9 illustrates a system according to certain embodiments of the invention. It should be understood that each block of the flowchart of FIG. 1-3 or 5-8 and any combination thereof may be implemented by various means or their combinations, such as hardware, software, firmware, one or more processors and/or circuitry. In one embodiment, a system may comprise several devices, such as, for example, network element 910 and user equipment (UE) or user device 920. The system may comprise more than one UE 920 and more than one network element 910, although only one of each is shown for the purposes of illustration. A network element can be an access point, a base station, an eNode B (eNB), server, host or any of the other network elements discussed herein. Each of these devices may comprise at least one processor or control unit or module, respectively indicated as 914 and 924. At least one memory may be provided in each device, and indicated as 915 and 925, respectively. The memory may comprise computer program instructions or computer code contained therein. One or more transceiver 916 and 926 may be provided, and each device may also comprise an antenna, respectively illustrated as 917 and 927. Although only one antenna each is shown, many antennas and multiple antenna elements may be provided to each of the devices. Other configurations of these devices, for example, may be provided. For example, network element 910 and UE 920 may be additionally configured for wired communication, in addition to wireless communication, and in such a case antennas 917 and 927 may illustrate any form of communication hardware, without being limited to merely an antenna. Likewise, some network elements 910 may be solely configured for wired communication, and such cases antenna 917 may illustrate any form of wired communication hardware, such as a network interface card.

Transceivers 916 and 926 may each, independently, be a transmitter, a receiver, or both a transmitter and a receiver, or a unit or device that may be configured both for transmission and reception. The transmitter and/or receiver may also be implemented as a remote radio head which is not located in the device itself, but in a mast, for example. It should also be appreciated that according to a liquid or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

A user device or user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof In an exemplary embodiment, an apparatus, such as a node or user device, may comprise means for carrying out embodiments described above in relation to FIG. 1-3 or 5-8. In an exemplary embodiment, an apparatus, such as a user device, may comprise means (924) for identifying at least one non-cellular access point based on searching Another exemplary apparatus, such as a node, may comprise means (914) for determining that an off-load condition exists in an area of a radio access network.

Processors 914 and 924 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof The processors may be implemented as a single controller, or a plurality of controllers or processors.

For firmware or software, the implementation may comprise modules or unit of at least one chip set, for example, procedures, functions, and so on. Memories 915 and 925 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity may be internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 910 and/or UE 920, to perform any of the processes described above (see, for example, FIGS. 1-3 and 5-8). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, or the like, or a low-level programming language, such as a machine language, or assembler. Alternatively, certain embodiments of the invention may be performed entirely in hardware.

Furthermore, although FIG. 9 illustrates a system including a network element 910 and a UE 920, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Glossary
2G Second Generation
3G Third Generation
3GPP Third Generation Partnership Project
ANDSF Access Network Discovery and Selection Function
ANQP Access Network Query Protocol
AP Access Point
BSC Base Station Controller
DM Device Management
eNB eNode B
GAS Generic Advertisement Service
HESSID Homogenous Extended Service Set ID
HetNet Heterogeneous Networks (here 3GPP and Wi-Fi focus, WiMAX not excluded)
HLR Home Location Register
HSS Home Subscriber Server
IMSI International Mobile Subscriber Identity
LTE Long Term Evolution
MAC Medium Access Control
MS Mobile Station
PDA Personal Data or Digital Assistant
RAN Radio Access Network
RAT Radio Access Technology
RFSP Radio Frequency Selection Priority (RAT/Frequency Selection Priority)

QoE Quality of Experience
QoS Quality of Service
RNC Radio Network Controller
RRC Radio Resource Control
RRM Radio Resource Management
SIB System Information Block
SSID Service Set Identifier
TS Technical Specification
UE User Equipment
WNM Wireless Network Management

We claim:

1. A method, comprising:
determining that an off-load condition no longer exists in an area of a cellular radio access network; and
commanding the user equipment to return to the cellular radio access network,
wherein a non-cellular network instructs the user equipment to return to the cellular radio access network,
wherein the user equipment is triggered by the instruction of the non-cellular network to contact a policy server after a successful extensible authentication protocol authentication.

2. The method of claim 1, wherein the non-cellular network is Wi-Fi network.

3. The method of claim 1, wherein an 802.11 or Hotspot 2.0 mechanism is used to instruct the user equipment to return to the cellular radio access network.

4. The method of claim 1, wherein a parameter of a message indicates to the user equipment to prefer cellular radio access network instead of non-cellular network.

5. An apparatus, comprising:
at least one processor; and
at least one memory including computer program code,
wherein the at least one memory and the computer program code are configured to, with the at least one processor, cause the apparatus at least to
determine that an off-load condition no longer exists in an area of a cellular radio access network; and
command the user equipment to return to the cellular radio access network,
wherein a non-cellular network instructs the user equipment to return to the cellular radio access network,
wherein the user equipment is triggered by the instruction of the non-cellular network to contact a policy server after a successful extensible authentication protocol authentication.

6. The apparatus of claim 5, wherein the non-cellular network is Wi-Fi network.

7. The apparatus of claim 5, wherein an 802.11 or Hotspot 2.0 mechanism is used to instruct the user equipment to return to the cellular radio access network.

8. The apparatus of claim 5, wherein a parameter of a message indicates to the user equipment to prefer cellular radio access network instead of non-cellular network.

* * * * *